United States Patent [19]

Ikeda et al.

[11] 3,900,670

[45] Aug. 19, 1975

[54] LAMINATED FILM STRUCTURE

[75] Inventors: Richard Masayoshi Ikeda, Chadds Ford, Pa.; Rudolph Henry Michel, Wilmington, Del.

[73] Assignee: E. I. Du Pont de Nemours and Company, Wilmington, Del.

[22] Filed: Sept. 7, 1973

[21] Appl. No.: 395,251

Related U.S. Application Data

[63] Continuation-in-part of Ser. No. 315,561, Dec. 15, 1972, abandoned.

[52] U.S. Cl. ............... 428/308; 264/289; 426/127; 426/145; 428/336; 428/315
[51] Int. Cl...... B32b 5/16; B32b 27/08; B32b 27/32
[58] Field of Search ........... 161/162, 168, 167, 402, 161/247, 254, 256, 402

[56] References Cited

UNITED STATES PATENTS

| | | | |
|---|---|---|---|
| 3,215,657 | 11/1965 | Beresniewicz | 161/247 |
| 3,264,272 | 8/1966 | Rees | 161/247 |
| 3,370,972 | 2/1968 | Nagel | 161/247 |
| 3,539,439 | 11/1970 | Calderwood | 161/402 |
| 3,579,416 | 5/1971 | Schrenk | 161/256 |
| 3,738,904 | 6/1973 | Ikeda | 161/168 |
| 3,741,841 | 6/1973 | Toyoda et al. | 156/229 |
| 3,758,661 | 9/1973 | Yamamoto | 161/402 |
| 3,765,999 | 10/1973 | Toyoda | 161/402 |
| 3,773,608 | 11/1973 | Yoshimura | 161/168 |
| 3,783,088 | 1/1974 | Yoshiyasu et al. | 161/160 |
| 3,790,435 | 2/1974 | Tanba et al. | 161/160 |
| 3,799,828 | 3/1974 | Takashi et al. | 156/229 |

*Primary Examiner*—George F. Lesmes
*Assistant Examiner*—Ellis P. Robinson

[57] ABSTRACT

A laminated film structure comprised of (a) a base layer of a biaxially oriented film having a cellular matrix, an inert filler dispersed therein and a surface that has a fibrous texture with surface ruptures, and laminated to at least one side of the base layer is (b) a grease-proof layer taken from the group of polymeric compositions consisting essentially of high-density polyethylene, polypropylene having a crystallinity of at least about 60%, and an ionomeric resin based on ethylene. The polymeric grease-proof layer can be stretched or unstretched. Alternatively, the film laminate can include a layer of a heat-sealable composition which preferably is a polymer taken from the group consisting essentially of an ethylene-vinyl acetate resin, an ionomeric resin based on ethylene, an ethylene-vinyl acetateionomeric resin based on ethylene, and low-density polyethylene. In still another alternative embodiment, the laminated film structure can include an overcoat of a barrier coating of vinylidene chloride compolymer of a pigmented polypropylene layer to increase the opacity of the laminated film structure. These film laminates are grease-proof, making them particularly suited for packaging foodstuffs containing grease or oil such as potato chips and cookies.

11 Claims, No Drawings

LAMINATED FILM STRUCTURE

RELATED APPLICATIONS

This application is a continuation-in-part of application Ser. No. 315,561 filed Dec. 15, 1972 now abandoned.

BACKGROUND OF THE INVENTION

The present invention relates to a laminated film structure comprised of a base layer of a biaxially oriented cellular polymer matrix having a filler dispersed therein, a layer of high-density polyethylene, and, optionally, a heat-sealing layer, a barrier layer, or a pigmented layer to improve the opacity of the film structure. These filled laminates are particularly useful in packaging greasy or oily foods such as potato chips, cookies or animal foods such as dog biscuits because these films are relatively grease-proof.

U.S. Pat. No. 3,738,904 to Ikeda and Ostapchenko discloses a biaxially oriented thermoplastic film having a cellular matrix with an inert filler dispersed therein. This film is used as the base layer in the present invention primarily because it has the necessary bulk and stiffness to stand and serve as a package for food items. This film does, however, have one shortcoming, namely, the fact that it is relatively permeable to grease and oil. In order to extend its usefulness as a cellular film, it is desirable to find a way to make the film relatively impermeable to grease and oil. Therefore, there is a need to find a way of improving this cellular film to make it relatively impermeable to grease and oil and render it useful in packaging foods such as potato chips and cookies.

SUMMARY OF THE INVENTION

Accordingly, the present invention provides a relatively grease-proof film laminate comprised of:

a. a biaxially stretched thermoplastic film having a cellular polymer matrix prepared from;
  1. a polymer having a crystallinity of at least about 60% at room temperature taken from the group consisting of homopolymers, copolymers, and blends thereof of α-olefins having 2 to 10 carbon atoms, having dispersed therein
  2. about 26 to 50 weight percent of an inert filler, based on the weight of the polymer and inert filler, having an average particle size of about 0.3 to 8 microns, wherein the filled polymer has an elongation of at least about 1,000% at a temperature within the range which is above the line drawing temperature and below the melting temperature of the polymer, said film having at least about 30% voids, an elongation at break at 22°C. of at least about 8% in each direction of stretch and about 2 to 40 surface ruptures per square millimeter; and laminated to at least one side of the biaxially stretched thermoplastic film b. a grease-proof layer of polymer taken from the group consisting essentially of (1) high-density polyethylene wherein the density of the polymer is from about 0.94 to 0.98 g./cc. at 25°C., (2) polypropylene having a crystallinity of at least about 60% and (3) an ethylene-based ionomeric resin prepared by copolymerizing a mixture of ethylene and unsaturated monocarboxylic acid in the presence of a free radical polymerization initiator, followed by bringing the copolymer into contact with an ionizable compound to effect crosslinking thereby forming an ionized copolymer. The polymeric, grease-proof layer can be stretched or unstretched.

Alternatively, the film laminate can include a third layer of heat-sealable composition which is a polymer taken from the group consisting essentially of (a) an ethylene-vinyl acetate resin, (b) an ionomeric resin based on ethylene, (c) an ethylene-vinyl acetate-ionomeric resin based on ethylene, or (d) low-density polyethylene. In still another alternate embodiment, the film structure can include an overcoat of a barrier layer of a vinylidene chloride copolymer, or a polypropylene layer containing a pigment to provide increased opacity.

DESCRIPTION OF THE INVENTION

The base layer of the laminated film structure of the present invention is described in U.S. Pat. No. 3,738,904 to Ikeda and Ostapchenko, which is hereby incorporated by reference. The base layer is comprised of a biaxially oriented thermoplastic film having dispersed therein an inert particulate filler surrounded by voids. The surface of the film is characterized by its fibrous texture and surface ruptures.

More particularly, the film consists of a polymer from the group consisting of homopolymers, copolymers and blends thereof of α-monoolefins having 2 to 10 carbon atoms with a crystallinity of at least 60% at 22°c. having dispersed therein 26 to 50 weight percent of an inert filler, based on total weight of polymer and filler, having a particle size of about 0.3 to 8 microns.

The film has a density of about 0.3 to 0.7 g./cc., an elongation at break of at least 8% in either direction of stretch at 22°C., an oxygen permeability of 900 to 10,000,000 cc./100 sq.in./24 hrs./atmosphere/mil and about 2 to 40 surface ruptures per square millimeter. In addition, the film has about 30 to 70% voids, and films can be made having a TAPPI opacity of at least about 85%. Films of the present invention are generally made having a final thickness of about 0.5 to 7.0 mils.

Other properties of the film such as burst strength, stiffness and modulus of elasticity vary according to the type of polymer and filler used. For example, a film having a thickness of about 4.3 mils prepared according to a preferred embodiment incorporating a copolymer matrix of about 98/2 weight percent units of ethylene/octene with a density of 0.956 g./cc. and a crystallinity of about 71% at 22°C. and about 35 weight percent calcined kaolin clay, based on total weight of copolymer and clay, having an average particle size of 5.5 microns is further characterized as having a Mullen burst strength of at least about 40 lbs., a Clark stiffness of at least about 15 and a modulus of elasticity of at least about 126 Kpsi. While another preferred film having a thickness of about 3.6 mils prepared incorporating polypropylene having a crystallinity of about 71% at 22°C. as a matrix with the same calcined kaolin clay dispersed therein exhibit properties characterized as a Mullen burst strength of at least about 40 pounds, a Clark stiffness of at least about 20 and a modulus of elasticity of about 115 Kpsi in either direction of stretch.

Various tests used to determine the properties and characteristics of the base layer of this invention are discussed below.

1. The density is measured by ASTM D 792-64T which provides a weight per unit volume based on the boundary dimensions of the specimen.

2. The tear propagation strength is measured by ASTM D-1922, wherein a specimen is notched and a tear propagating from the notch is made and the force required to progagate the tear is measured.

3. The elongation at break, modulus of elasticity, and tensile strength at room temperature, i.e., about 22°C., are measured by ASTM D-882.

4. The elongation at elevated temperatures is measured bu an Instron Oven test wherein a rectangular specimen is prepared that is 1 inch wide and 4 inches long along the two longer sides. The specimen is punched on both sides, at the center of the long dimension with a McBee Punch, type 5227-643, leaving a narrow center section having a length of about 0.150 inch. The specimen is gripped and pulled at the rate of five inches per minute permitting the sample to stretch in its long dimension.

The elongation is measured in percent according to the following equation:

$$E = \frac{L_F - L_0}{L_0} \times 100$$

where: E = % elongation,
$L_F$ = length of specimen's effective gauge length at break,
$L_0$ = original gauge length of specimen.

Thickness measurements are made in accordance with ASTM D-374.

5. Tear initiation strength is measured by ASTM D-1004.

6. TAPPI (Technical Association of Pulp and Paper Industry) Stiffness, sometimes referred to as Clark Stiffness, is measured by TAPPI test T-451.

7. Opacity is measured by TAPPI test T-425.

8. TAPPI burst strength, sometimes referred to as Mullen Burst, is measured by TAPPI test T-403.

9. Percent voids is determined by the following equation:

$$\% \text{ Voids} = 100 - \left(\frac{\text{density of stretched film}}{\text{density of film before stretching}}\right) \times 100$$

10. The number and size of the surface ruptures can be measured by metallizing the film with aluminum at an angle normal to the film surface, transmitting light through the film perpendicular to the film, then counting the number and measuring the size of the light spots shining through the film.

11. The oxygen permeability is measured by ASTM D-1434.

Following is a description of the process used to make the base film of the present invention.

The film base is prepared from a polymer having dispersed therein an inert filler. Useful polymers include homopolymers, copolymers or blends thereof of α-monoolefins having 2 to 10 carbon atoms wherein the polymer has a crystallinity of at least about 60% at room temperature.

Representatives examples of useful homopolymers include the homopolymers such as polyethylene, polypropylene, poly(1-butene), poly(3-methyl-1-butene), poly(3-methyl-1-pentene), poly(4-methyl-1-pentene), poly(4,4-dimethyl-1-pentene), poly(3-methyl-1-hexene), poly(4-methyl-1-hexene), and poly(4,4-dimethyl-1-hexene).

Useful copolymers include ethylene/propylene, ethylene/1-butene, ethylene/1-pentene, ethylene/1-hexene, ethylene/1-octene, ethylene/1-heptene, ethylene/1-nonene, and ethylene/1-decene.

Useful blends thereof include blends of homopolymers such polyethylene and polypropylene or blends of a homopolymer and a copolymer such as polyethylene blended with ethylene/octene or ethylene/decene.

Blends of two copolymers such as ethylene/1-octene and ethylene/1-butene can also be used provided they have a crystallinity of at least about 60% at room temperature.

The crystallinity of a polymer is difficult to measure directly, therefore, it has become conventional to use an indirect method of measuring crystallinity. One such method is described in *Physical Chemistry of Macromolecules*, authored by C. Tanford, published by John Wiley and Sons (1961) at page 125. The method described therein is based on the fact that the crystallinity of the polymer is related to the density of the polymer and, accordingly, a chart has been prepared correlating density to crystallinity. Therefore, it is only necessary to measure the density of a polymer by conventional means, refer to the type of chart in *Physical Chemistry of Macromolecules* referenced above, and pick out the crystallinity of the polymer. Density of the polymer can be measured by ASTM D-792-64-T.

Useful fillers can be organic or inorganic. They must be relatively inert toward the polymer, have a relatively low interfacial surface tension making it practically noncohesive toward the polymer matrix, have an average particle size of about 0.3 to 8 microns and be present in the amount of about 26 to 50 weight percent based on the total weight of polymer and filler. Average particle size of a filler material is determined by having 50% by weight of the filler pass through a sieve having openings the size of the average particle size designation.

If the particles have an average size less than about 0.3 micron, few or inconsequential voids result. If the average particle size is greater than 8 microns, large and fewer voids than desirable form which do not provide the desired low density. The amount of filler present is based primarily on practicalities; however, it has been found that there should be at least about 26 weight percent to provide sufficient nucleation centers for voiding but no greater than about 50 weight percent in order to provide a film flexible enough to handle. If the amount of filler is significantly greater than 50 percent, the film becomes weak and tends to crack and tear easily.

Useful inert, inorganic fillers include silica, calcium carbonate, diatomaceous earth, titanium dioxide and clays while useful organic fillers include nylon, polyesters and polyamides, provided they are below their softening temperature at the stretching temperature of the film and are in the disclosed particle size range. A preferred filler is kaolin clay, commercially available as "Alumex R," "Hi-White R," "Macnamee Clay," "Paragon Clay," "Polyfil," or "Engelhard-ASP 400."

When using the preferred filler, i.e., clay, it has been helpful to calcine the clay prior to its incorporation into the polymer. It is believed that calcined clay has a lower adhesive bond to the polymer then uncalcined clay and, therfore, during stretching, polymer easily pulls away from the calcined clay providing an increased number of open cells or voids for a given stretch ratio thereby assisting in decreasing the density of the film. Typically, when using calcined clay, the percent increase in the number of voids is about 30 to 45% compared to the number of voids obtained using an uncalcined clay. This amounts to an increase of about 20 to 25% in opacity.

The inert filler is dispersed within the polymer and this can be accomplished by conventional means such as melt-blending. The polymer-filler composition must have an elongation of at least 1000% at a temperature within the range of about the line-drawing temperature and the melting temperature of the polymer. The line-drawing temperature and the melting temperature of a useful polymer can be determined experimentally.

The line-drawing temperature is defined in the following manner: When a polyolefin film is stretched at temperatures low enough for line drawing, a "line" or "neck" develops in the film perpendicular to the direction of stretch once the yield point is reached. Stretching then emanates from this thinned out region until an elongation equal to the natural draw ratio of the polyolefin is achieved for the particular stretch rate used. If a series of polyolefin film samples is stretched under conditions of line-drawing at a set of increasingly higher temperatures (starting from room temperature, e.g.), a series of decreasingly sharp maxima will result in the corresponding stress-strain curves. At some higher temperature, a maximum no longer appears in the stress-strain curve, and line-drawing has creased. At this temperature of higher temperature, the film undergoes more uniform stretching over its length and no longer displays a line or neck during elongation. For more detailed discussions of line-drawing, refer to U.S. Pat. Nos. 2,961,711; 3,057,835; and "Polyethylene" by Renfrew and Morgan, 2nd Edition, pages 170–172, published by Interscience Publishers, Inc., New York (1960).

A significant fact related to the line-drawing temperature of a film is that the line-drawing temperature can change. For example, a film has a given line-drawing temperature before stretching. However, after stretching in one direction, i.e., uniaxial stretching, the line-drawing temperature of the film in the direction perpendicular to the uniaxial stretch is higher than the given temperature. This fact must be taken into consideration in order to provide biaxial stretching at the proper stretching temperature.

The melting point can be experimentally determined by heating a polymer and noting the temperature of disappearance of the last trace of crystallinity as evidenced by birefrigence observed between crossed polarizers on a hot-stage microscope. Further information related to definition of the melting point can be obtained from "Textbook of Polymer Science" by F. W. Billmeyer, Jr., Interscience Publishers, Inc., New York, page 158 (1962).

In addition to the polymer and filler, the film-forming composition can contain other additives which do not adversely affect the resultant product such as antistatic agents.

After the film composition is prepared, it is formed into a film by conventional film-forming equipment. Thereafter, it is biaxially oriented by stretching either simultaneously or sequentially at least about two times, and preferably three to seven times, its original film-forming dimensions in mutually perpendicular directions at a temperature which is above the line drawing temperature and the melting temperature of the polymer (where the polymer-filler composition has an elongation at break of at least 1000%), until the film contains at least about 30% voids and preferably about 40 to 70% voids.

Biaxial stretching of the film form its original forming dimensions is important for at least the following reasons:

Stretching breaches the bond between the polymer matrix and the inert filler creating voids in the polymer matrix and a fibrous surface with ruptures on the surface of the film. Increasing the stretch ratio within the limits described above increases the number of voids in the polymer matrix causing an increase in the opacity of the film and a decrease in the density. In addition, biaxial stretching balances the tear strength of the film.

It has been found that sequential biaxial stretching, i.e., stretching in one direction first, usually the machine direction (MD) of the film at one temperature followed by transverse direction (TD) stretching of the film at a higher stretch temperature, is advantageous to obtaining an end product that has a relatively high oxygen permeability. Simultaneous stretching or rapid sequential stretching at one uniform temperature on the other hand, results in equivalent density films with relatively lower oxygen permeability.

The stretch ratio of at least 2 times the original forming dimensions is significant to producing a film having at least 30% voids resulting in relatively high density films. However, to produce relatively low density films, it is preferred that the film be stretched at least 3 to 7 times its original forming dimensions in mutually perpendicular directions, resulting in a film having about 40 to 70% voids.

While the degree of stretch is significant to providing voids, the degree of voiding is also closely related to the filler content and size. It has been found that the higher the filler content or the smaller the particle size, within the range specified, the greater the degree of voiding. Oxygen permeability, on the other hand, is related to the number and size of voids. It has been found that increasing the amount of filler, or increasing the filler size, will result in increased oxygen permeability.

In sequential stretching, where the first and second stretching operations are carried out at different temperatures, the conditions during first direction of stretch are very important because they greatly influence the degree of oxygen permeability in the film structure and the amount of surface ruptures for a given filler type and content.

The oxygen permeability of the biaxially stretched thermoplastic film, for a given filler loading, can be approximated by the following formula disclosed in U.S. Pat. NO. 3,738,904:

$$\text{Log } P = C_1 \log T + C_2 \qquad (1)$$

where:
P = oxygen permeability in the final film product, experimentally determined constants related
$C_1$, $C_2$ = to film composition and process parameters used to make the film, T = temperature of the film during the first stretching operation.

Actual oxygen permeability can be checked against this equation by determining the oxygen permeability of the film according to ASTM D-1434.

In addition to controlling the degree of oxygen permeability by controlling the film temperature during the first direction stretch, a differential oxygen permeability can be created through the film by differentially cooling or heating the surfaces of the film after casting and before the first direction stretch. The cooler the film surface, the higher the oxygen permeability through that surface will be. This differential oxygen permeability is made evident by placing a few drops of isopropyl alcohol on the two surfaces of a film that has been differentially cooled or heated and observing the relative permeability rates. The surface that receives the most heating or least cooling is permeated very slowly or not at all while the surface receiving the least heating or greatest amount of cooling is easily permeated.

While the degree of oxygen permeability can be determined and controlled in accordance with the relationship of Equation 1 above, it has been found that oxygen permeability is sensitive to change only over a given temperature range. Therefore, while films can be made according to the present invention wherein the stretching operation and, in particular, the first stretching operation can be effectively carried out at a temperature between about the line-drawing temperature and the melting temperature of the polymer, it is only at some given temperature range within this broad range that the oxygen permeability can actually be changed by changing the temperature of the first stretching operation.

For example, the line-drawing temperature for a filled polyethylene useful in preparing film of the present invention is about 121°C. and the polymer-melting temperature is about 131°C., so that films can be made according to the present invention with the temperatures of the first stretching operation anywhere from about 121° to 131°C. However, significant changes in oxygen permeability can only be evidenced over the temperature range of about 126°-128°C. during the first stretching operation with the temperature of the film during the second direction stretch somewhat higher. When the first stretching operation is carried out at a temperature between 121° and 126°C., maximum oxygen permeability is obtained and when the temperature is 128° to 131°C., minimum oxygen permeability is obtained. The particular temperature range where the film is most sensitive to substantial changes in oxygen permeability can be determined experimentally for other films.

The first stretching operation is also very important in determining the amount and size of surface ruptures. It has been found that the ruptures can have a size variance from about 10 to 300 microns in their maximum dimension measured in a plane parallel to the surface of the film and number about 2 to 40 ruptures per square millimeter. The number of surface ruptures increases as the temperature of the film decreases during the first stretching operation. The fibrous surface along with the surface ruptures provides an excellent ink-receptive surface.

The second direction of stretch, whether carried out sequentially or simultaneously, is particularly important to (a) balance the properties of the film such as tear srength and elongation, (b) provide a significant increase in voiding compared to the voids created during the first direction stretch. The elongation of at least 8% at 22°C. provides a film having adequate toughness and impact stretch making it useful for packaging where impact loading can occur. It has been found that the percent elongation decreases as the stretch ratio in the second direction of stretch increases. A relatively high stretch ratio produces relatively high voiding resulting in a low elongation. Therefore, a relatively high stretch ratio must be balanced against the loss in elongation in order to provide at least an 8% elongation at 22°C.

After the film is biaxially oriented, the film can optionally be heat-set, then cooled to room temperature and wound on a winding roll.

A preferred process for preparing the thermoplastic base films of the present invention will now be described.

The ingredients, namely, about a 98/2 weight percent copolymer of ethylene/octene units having a density of 0.956 g./cc. and a crystallinity of about 71%, typically in the form of pellets, 35 weight percent of Englehard ASP-400 calcined kaolin clay filler having an average particle size of 5.5 microns and adjuvants, if desired, are added to an extruder through a hopper wherein the ingredients are mechanically melt-blended. In mechanically melt-blending the ingredients, caution must be taken not to shear the ingredients beyond a point where the terminal heat generated by the shearing action of the mechanical melt-blending becomes great enough to degrade the polymer. The melt is then extruded through a slot die into a film. The die opening is typically about 50 mils in thickness and the film existing the die is drawn down to about 35–40 mils thick and at a temperature of about 240°C.

The film is extruded onto a casting wheel maintained at a temperature of about 85° to 90°C. and doctored on the casting wheel by doctor roll maintained at a temperature of about 80°–95°C. The doctor roll assists in distributing the polymer across the width of the film providing a uniformly gauged film and also assists in cooling the film to provide form stability. In extruding the polymer, caution must be taken to have the film temperature at approximately 155°–165°C. If the film is hotter than 165°C., the melt will stick to the chill roll and if the film is cooler than 155°C., air bubbles tend to form between the chill roll and the film in either event the surface of the film will become damaged.

The film leaves the casting wheel at a temperature of about 130° to 135°C. and passes onto a roll maintained at a temperature of about 125° to 130°C., cooling the film about 5°C. to a temperature of about 125° to 130°C., i.e., the mechanical orientation temperature of the film, that is between the line-drawing temperature and the polymer-melting temperature. The film is now stretched about 3.5–7 times its original length in the machine direction, i.e., the longitudinal direction of the film. Stretching is accomplished by passing the film through a set of nip rolls, over idler rolls and through a set of nip rolls. The last set of nip rolls are driven at a peripheral speed that is 3.5–7 times faster than the peripheral speed of the first set of nip rolls with the major portion of the stretching taking place between the first set of nip rolls and the first idler roll.

During longitudinal stretching, the film cools about 15°–20°C.; therefore, it is necessary to reheat the film to a temperature of 125° to 130°C. before stretching in the transverse direction. Accordingly, the film leaves the last set of nip rolls and enters a heating chamber where the film is reheated to 125° to 130°C. The film is then transversely stretched in a tenter frame wherein the film is stretched 3.5 to 7 times its original width in the transverse direction.

After biaxial stretching is complete, the film can optionally be heat-set in a heating chamber, cooled to room temperature in a cooling chamber and wound on a wind-up roll for use.

Laminated to at least one side of the film base is a grease-proof layer. The grease-proof layer is a polymeric composition taken from the group consisting of (a) high-density polyethylene wherein the density of the polymer is from about 0.94 to 0.98 g./cc. at 25°C., (b) polypropylene having a crystallinity of at least about 60%, and (c) an ionomeric resin based on ethylene.

The ionomeric resin is prepared by copolymerizing a mixture of ethylene and unsaturated monocarboxylic acid in the presence of a free radical polymerization initiator, followed by bringing the copolymer into contact with an ionizable component to effect cross-linking forming an ionized copolymer. The ionomeric copolymers are obtained by neutralization of the initial copolymer with an ionizable (water-soluble) metal compound yielding a metal ion having an ionized valence of 1 to 3 inclusive. The concentrations of the metal ion should be such that at least 20% of the carboxylic acid groups of the copolymer are neutralized and exist in the ionic state. Suitable metal ions include sodium, zinc, and aluminum.

The ionomeric polymers useful in this invention are further described in U.S. Pat. No. 3,264,272, hereby incorporated by reference. Of the useful ionomeric resins, the preferred composition is a copolymer of ethylene/10% methacrylic acid with a melt index of 1.2 and 50% neutralized with sodium.

The grease-proof film layers can be laminated to the base layer by many different methods. The polymer can be formed into a film and the film used in its oriented state, or it can be uniaxially oriented or biaxially oriented prior to lamination. Lamination can be effected by conventional means such as melt press or adhesive lamination and the film can be subjected to an electrical discharge or a flame treatment to assist in the adhesion. In addition, the grease-proof layer can be coextruded and processed along with the base layer.

The grease-proof layer can be applied in many different thicknesses depending on its conditions of use. However, it has been found that a thickness of about 0.5 to 1 is practical for most uses. The grease-proof layer can be applied to one or both sides of the base layer again depending on the conditions of use.

When applied to both sides of the base layer, the resulting laminate has much enhanced rigidity. For example, laminates of the base layer between high density polyethylene or ionomeric polymer are useful in applications where a laminate of the base layer to only one grease-proof layer has inadequate resistance to bending. Laminates having a grease-proof layer on both sides of the base layer also have special utility in applications where dusting from the base layer cannot be tolerated.

The grease-proof layers described above also assist in increasing the puncture resistance and abrasion resistance of the film laminate.

In an optional and alternate embodiment, the film laminate of a base layer and a grease-proof layer can include a sealing layer prepared from a heat-sealable composition. The heat-sealable layer is laminated to the film on the side of the film that will be used to seal the film and form a package.

Useful heat-sealable compositions are polymers taken from the group consisting essentially of (a) an ethylene-vinyl acetate copolymer including ammonium proteinate that is described in U.S. Patent application Ser. No. 229,511, filed Feb. 25, 1972, hereby incorporated by reference, and briefly described below, (b) an ethylene-wax terpolymer coposition as described in U.S. Pat. No. 3,215,657, hereby incorporated by reference, and briefly described below, (c) the ionomeric resin based on ethylene as described above, and (d) low-density polyethylene wherein the density is about 0.91 to 0.93 g./cc. at 25°C.

The ethylene-vinyl acetate copolymer including ammonium proteinate is more particularly described as about 60 to 70 parts by weight of ethylene-vinyl acetate copolymer having an ethylene content of 70 to 85 weight percent based on the weight of the copolymer present, about 20 to 25 weight percent of a wax having a melting point of at least 60°C., about 5 to 15 parts by weight of a dispersing agent of sodium-ammomium rosinates having at least 75% ammonium rosinate content, about 0.5 to 5 parts by weight of ammonium proteinate, about 1 to 10 parts by weight of a polymerized resin ester and about 0.5 to 5 parts by weight of a stearate salt of a metal selected from Group II of the Periodic Table and having an atomic number between 12 and 30.

The ethylene-wax terpolymer composition is comprised if (a) 25 to 99 weight percent of a petroleum wax and (b) 75 to 1 weight percent of a terpolymer of (1) at least 65 weight percent ethylene, (2) at least 5 weight percent of an ester such as a vinyl ester, e.g., vinyl acetate, an alkyl acrylate such as ethyl acrylate, or an alkyl methacrylate such as methyl methacrylate, and (3) about 0.1 to 3.0 weight percent of a monomer such as methacrylic acid, acrylic acid, itaconic acid, maleic acid and fumaric acid.

A preferred ethylene-wax terpolymer is comprised of 70 weight percent of a petroleum wax and 30 weight percent of a terpolymer of ethylene-vinyl acetate-methacrylic acid containing 30 weight percent vinyl acetate and 0.60 weight percent methacrylic acid.

The sealable layers can be applied to laminated film structures of the base and grease-proof layer by conventional techniques. Coating is preferred because of its ease of application. The thickness of the heat-sealable layer is not critical but it must be sufficient to form and maintain a seal.

In still another optical and alternate embodiment, the film laminate of the present invention can be overcoated on one or both sides with a layer of vinylidene chloride copolymer to provide excellent barrier properties such as low oxygen permeability or it can be overcoated with a layer of crystalline polypropylene containing a pigment to provide increased opacity. The barrier coating of vinylidene chloride, or the pigmented coating of polypropylene can be applied by a number of conventional techniques with coating preferred because of its ease of application.

The basic film laminate of the present invention including the base layer and the grease-proof layer can be used as a package liner or it can be made to include a sealing layer making it useful in forming the complete package itself. If additional barrier properties are desired, such as low oxygen permeability or increased opacity, the film can be additionally coated with a vinylidene chloride copolymer composition or a layer of polypropylene containing the desired pigment, respectively.

The following examples will serve to more fully illustrate the principles and practice of this invention. All parts, percentages and ratios are based on weight unless otherwise indicated. Reported filler content (%) in the filled polyethylene and polypropylene films is based on total weight of filler and polymer.

In the examples, the heat-seal strengths are determined by measuring the force in grams required to separate heat-sealed strips of film 1 inch wide and are recorded as g./in. All measurements are taken with a Sutter Peel Tester.

EXAMPLE 1

A 14-mil-thick film of high-density polyethylene is extruded and quenched to form a form-stable film. This formed film of high-density polyethylene is placed on top of a freshly extruded, hot film of polyethlene which has a thickness of about 35 mils and contains about 30% clay. The two films are passed through a set of nip rolls to melt-laminate the films together. Thereafter, the polyethylene containing the clay is processed as discussed above in regard to processing of the base layer. The two films are quenched, then stretched approximately 3.0 times in the machine direction at 128°C. followed by stretching in the transverse direction to the machine direction of the machine about 5.3 times its original dimensions at a temperature of about 131°–132°C. The final film is about 5 mils thick with the high-density polyethylene layer being about 1 mil of the 5-mil thickness. The base layer containing the clay has approximately 40% voids.

This film laminate is formed into a package filled with potato chips which are crushed and the package is then stored for 1 month at 100°F. After the one-month testing period, the package shows no oil or grease leakage.

Similar bags prepared from the same film laminate are filed with abrasive, oily cookies and shaken for 1 hour. After the hour of testing, the bags are not worn through and no oil or grease spots shown through the package.

Similar bags prepared from the same laminate are filled with a pointed-edge dog biscuit. The bags are dropped from a height of about 4 feet at room temperature. In testing about 10 bags containing about 5 pounds of the dry dog biscuits, the packages sustained about 8–14 drops before puncturing.

EXAMPLE 2

Polyethylene containing about 30 weight percent clay is extruded onto high density polyethylene film, quenched and stretched in the machine direction about 3 times its original dimensions at a temperature of 132°C. Thereafter, it is stretched in the transverse direction about 5 times its original dimension at 130°C.

The resulting film has a thickness of about 3.9 mils and contains about 38% voids, on one side a layer of high-density polyethylene of about 1 mil and treated on both sides by subjecting the film to an electrical discharge treatment. Thereafter, 500 feet of the film is coated on the side containing the high-density polyethylene with a coating of an ethylene-vinyl acetate heat-sealing composition as described in Example 1 of U.S. Pat. application Ser. No. 229,511, filed Feb. 25, 1972.

This ethylene-vinyl acetate sealing layer is applied as a dispersion of 50% solids made from 100 parts of a dispersion containing 68 parts of ethylene-vinyl acetate copolymer of 82% ethylene content and having a melt index of 2.5 g./10 min. (ASTM 123), 22 parts of paraffin wax, and 10 parts of wood rosin acid neutralized with ammonium hydoxide. The above dispersion is mixed with a solution of 1 part soya protein as ammonium proteinate in ammonium hydroxide solution, 2.5 parts of an aqueous dispersion of polymerized wood rosin ester, 3 parts of calcium stearate and 0.25 part of pq yvinyl chloride particulates.

In addition, another 500 feet of the same film is overcoated with the same composition on both sides. The single-layer coating of ethylene-vinyl acetate is coated to a thickness of 6 grams per square meter, whereas each coating layer on the 500 feet of film coated on two sides is coated to a thickness of 8 grams per square meter.

Strips of film were cut from the 500-foot rolls and heat-sealed together by bringing the films together for 0.5 second with a pressure of about 8 pounds per square inch gauge at a temperature of 110°C. The films were tested by the Peel Test. Of the films coated on one side with an ethylene-vinyl acetate film thickness of about 6 grams per square meter of those coatings that were bonded with one coating against another, it took approximately 962 grams per inch to separate the films; whereas it took approximately 290 grams per inch to separate films where the ethylene-vinyl acetate coating layer was heat-sealed to the uncoated side of the film structure.

If the side of the base layer containing the high-density polyethylene is considered the inside, and the side of the base layer that does not contain the high-density polyethylene layer is considered the outside, which would be the typical situation when this film is used in packaging foodstuffs, the following heat-sealing results were obtained: (a) When the outside was heat-sealed to another outside layer, it took about 772 grams per inch to separate the films; (b) when the inside was heat-sealed to another inside layer, it took about 1002 grams per inch to separate the film laminates; and (c) when an inside was heat-sealed to an outside layer, it took about 588 grams per inch to separate the film layers.

EXAMPLE 3

Polyethylene filled with about 35 weight percent clay is extruded onto high density polyethylene film, quenched and stretched in the machine direction about 4 times its original length at a temperature of about 129°C. Thereafter, the film is stretched in the transverse direction about 3 times its original dimensions at 132°C. The resulting film contains about 60% voids and is coated on one side with about a 1-mil-thick layer of high-density polyethylene. Herein, the side coated with high-density polyethylene is called the inside and the uncoated side is called the outside. This film laminate is then overcoated on both sides with a layer of an ethylene-based ionomeric resin comprised of 70 weight percent of a petroleum wax and 30 weight percent of a terpolymer of 69.4 weight percent ethylene, 30 weight percent vinyl acetate, and 0.6 weight percent of methacrylic acid (M.I. 9.3) as described in Example 2 of U.S. Pat. No. 3,215,657. The layers are coated to a thickness of about 0.25 mil.

Thereafter, the films are heat-laminated to each other at a temperature of about 100°C. for about 0.5 second under a pressure of about 8 pounds per square inch gauge. When the inside portions of the film laminates were heat-sealed to each other, it took about 250 grams per inch out of an average of 5 pulls from a film strip about 0.5 inch in width. When the outside was laminated to the outside, there was a coating-to-coating heat seal which took approximately 340 grams per inch out of an average of 5 pulls from a film strip having a width of 0.5 inch.

EXAMPLE 4

Polyethylene containing about 30 weight percent clay was extruded onto a quenching drum at a thickness of about 35 mils. While on the quenching drum, a film layer of the preferred ionomeric resin based on ethylene, namely, a copolymer of ethylene/10% methacrylic acid with a melt index of 1.2 and 50% neutralized with sodium, having a thickness of about 7 mil was laminated to the hot, filled polyethylene. After quenching, the film laminate was stretched 4.5 times in the machine direction and simultaneously stretched 4.5 times in the transverse direction at a temperature of about 127°C.

After stretching, the films were heat-sealed by bringing the films together for about 0.5 second under a pressure of about 8 pounds per square inch gauge. Heat seals were formed at 100°C., 110°C., and 120°C. with one coated side of the film addressing another coated side of the film. Those films sealed at about 100°C. required about 604 grams per inch to separate, those films sealed at 110°C. required about 890 grams per inch to separate, and those films sealed at 120°C. required about 870 grams per inch to separate.

EXAMPLE 5

Polyethylene mixed with 30 weight percent clay is melt-blended and extruded onto a casting drum to a film thickness of about 39 mils. Hot-rolled to the as-cast film is a 4-mil layer of low-density polyethylene on one side. The film laminate is stretched in the machine direction about 3.1 times its original dimensions at a temperature of about 127°C. Thereafter, the film is stretched about 4.6 times its original dimensions with the film at a temperature of about 132°–133°C.

The film was then quenched to room temperature and heat-sealed by pressing two layers of this film structure together wherein the facing containing the low-density polyethylene addressed the face of another film which also contained a coating of the low-density polyethylene for 5 seconds with 8 pounds psi gauge at a temperature of about 145°C. A Peel Test showed that it requires about 437 grams per inch to separate the laminated film structure.

EXAMPLE 6

Polypropylene containing 35 weight percent clay was mixed and melt extruded onto a quenching roll. The propylene-clay film was melt-laminated onto a second layer of polypropylene which contained about 15 weight percent titanium dioxide and about 15 weight percent calcium carbonate. The entire structure was then simultaneously biaxially stretched about 4 times its original dimensions in each of two mutually perpendicular directions at a temperature of about 145°C. The resulting film had a thickness of about 2 mils and an opacity of about 95%. The polypropylene layer containin the titanium dioxide and calcium carbonate had a thickness of about 0.1 mil and had increased the opacity from 85% to 95% as contrasted with an uncoated polypropylene-clay base film layer.

EXAMPLE 7

A polypropylene film containing 35 weight percent clay was biaxially stretched about 4 times its original dimensions in mutually perpendicular directions at a temperature of 145°C. to form a film with about 60% voids surrounding the inert particle clay filler. This filled and stretched polypropylene film was coated with vinylidene chloride copolymer as a 5 weight percent solution in tetrahydrofuran. Without the coating, the filled and stretched polypropylene film layer had an oxygen permeability value of about 470 units (cc./100 in.$^2$/24 hrs./atmosphere). With a vinylidene chloride copolymer coating having a thickness of about 0.064 mil, the oxygen permeability value was reduced to about 13 units.

We claim:
1. A film laminate consisting essentially of:
   a. a biaxially stretched thermoplastic film having a cellular polymer matrix prepared from:
      1. a polymer having a crystallinity of at least about 60% at room temperature taken from the group consisting of homopolymers, copolymers, and blends thereof of α-olefins having 2 to 10 carbon atoms, having dispersed therein
      2. about 26 to 50 weight percent of an inert filler, based on the weight of the polymer and inert filler, having an average particle size of about 0.3 to 8 microns,
   wherein the filled polymer has an elongation of at least about 1,000% at a temperature within the range which is above the line drawing temperature and below the melting temperature of the polymer, said film having at least about 30% voids, an elongation at break at 22°C. of at least about 8% in each direction of stretch and about 2 to 40 surface ruptures per square millimeter; laminated to at least one side thereof
   b. a polymeric grease-proof layer of about 0.5 to 1 mil taken from the group consisting of:
      1. high-density polyethylene wherein the density of the polymer is from about 0.94 to 0.98 g./cc. at 25°C.,
      2. polypropylene having a crystallinity of at least about 60%, and
      3. an ethylene-based ionomeric resin prepared by copolymerizing a mixture of ethylene and unsaturated monocarboxylic acid in the presence of a free radical polymerization initiator, followed by bringing the copolymer into contact with an ionizable compound to effect cross-linking forming an ionized copolymer, and
   c. at least one polymeric layer taken from the group consisting of:

1. 60 to 70 parts by weight of ethylene-vinyl acetate copolymer having an ethylene content of 70 to 85 weight percent based on the weight of the copolymer present, about 20 to 25 weight percent of a wax having a melting point of at least 60°C., about 5 to 15 parts by weight of a dispersing agent of sodium-ammonium rosinates having at least 75% ammonium rosinate content, about 0.5 to 5 parts by weight of ammonium proteinate, about 1 to 10 parts by weight of a polymerized rosin ester and about 0.5 to 5 parts by weight of a stearate salt of a metal selected from Group II of the Periodic Table and having an atomic number between 12 and 30,
2. an ethylene-wax terpolymer composition comprised of 25 to 99 weight percent of a petroleum wax and 75 to 1 weight percent of a terpolymer of at least 65 weight percent ethylene, at least 5 weight percent of an ester, an alkyl acrylate or an alkyl methacrylate and about 0.1 to 3.0 weight percent of a monomeric acid selected from the group of methacrylic, acrylic, itaconic, maleic and fumaric acid,
3. an ethylene-based ionomeric resin prepared by copolymerizing a mixture of ethylene and unsaturated monocarboxylic acid in the presence of a free radical polymerization initiator followed by bringing the copolymer into contact with an ionizable compound to effect crosslinking forming an ionized copolymer,
4. low-density polyethylene wherein the density is about 0.91 to 0.93 g./cc. at 25°C., and
5. a vinylidene chloride copolymer composition.

2. The film laminate of claim 1 wherein the polymeric, grease-proof layer is uniaxially oriented.

3. The film laminate of claim 1 wherein the polymeric, grease-proof layer is biaxially oriented.

4. The film laminate of claim 1 wherein the cellular polymer matrix is polyethylene.

5. The film laminate of claim 1 wherein the cellular polymer matrix is polypopylene.

6. The film laminate of claim 1 wherein the ethylene-based ionomeric resin is a copolymer of ethylene/10% methacrylic acid having a melt index of 1.2 and 50% neutralized with sodium.

7. The film laminate of claim 1 wherein the ethylene-wax terpolymer is comprised of 70 weight percent of a petroleum wax and 30 weight percent of a terpolymer of ethylene-vinyl acetate-methacrylic acid containing 30 weight percent vinyl acetate and 0.6 weight percent methacrylic acid.

8. The film laminate of claim 1 additionally including at least one layer of polypropylene having a crystallinity greater than 60% and containing a pigment.

9. The film laminate of claim 1 wherein a grease proof layer is laminated to both sides of the cellular polymer layer.

10. The film laminate of claim 9 wherein the grease proof layers are high density polyethylene.

11. The film laminate of claim 9 wherein one grease proof layer is high density polyethylene and the second grease proof layer is ethylene-based ionomeric resin.

* * * * *